UNITED STATES PATENT OFFICE.

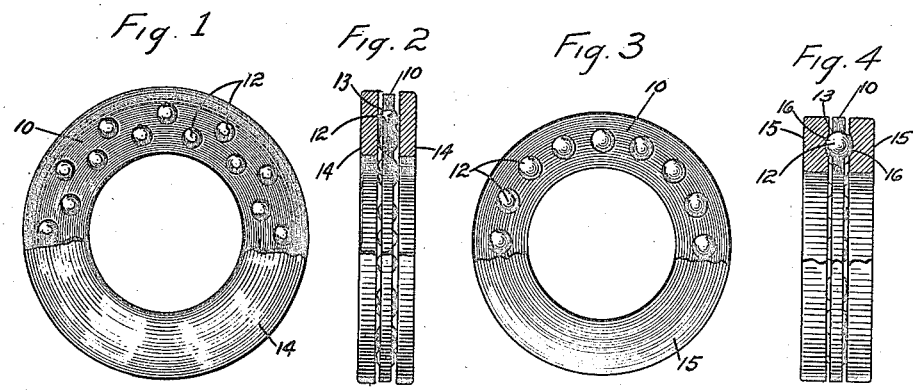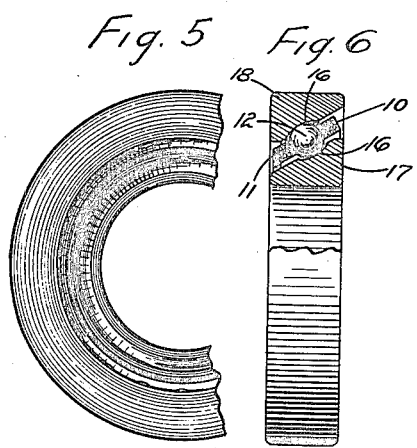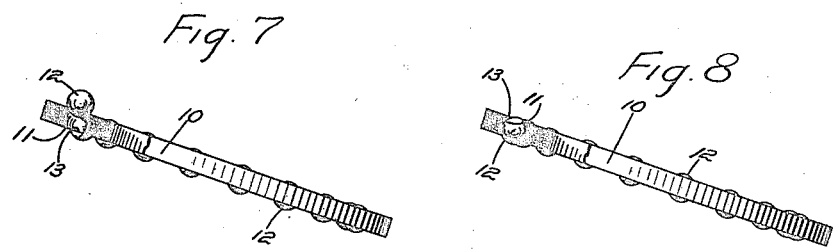

LEWIS R. HEIM, OF DANBURY, CONNECTICUT, ASSIGNOR TO THE BALL AND ROLLER BEARING COMPANY, OF DANBURY, CONNECTICUT, A CORPORATION OF CONNECTICUT.

BALL-CAGE FOR BEARINGS.

1,222,760.

Specification of Letters Patent.

Patented Apr. 17, 1917.

Application filed July 3, 1916. Serial No. 107,245.

*To all whom it may concern:*

Be it known that I, LEWIS R. HEIM, a citizen of the United States, residing at Danbury, county of Fairfield, State of Connecticut, have invented an Improvement in Ball-Cages for Bearings, of which the following is a specification.

This invention has for its object to provide a flexible non-metallic ball cage for bearings formed complete ready to receive the balls, and which will permit the balls to be sprung into the pockets and when there will retain them securely in place without any additional operations whatsoever.

With this end in view, I have devised the novel ball cage which I will now describe, referring to the accompanying drawing forming a part of this specification and using reference characters to indicate the several parts:—

Figure 1 is a plan view partly broken away, and Fig. 2 an edge view, partly in section, showing the use of my novel ball cage in a plain thrust bearing;

Fig. 3 a plan view partly broken away, and Fig. 4 an edge view partly in section, showing the use of my novel ball cage in a grooved thrust bearing;

Fig. 5 a partial plan view and Fig. 6 an edge view partly in section showing the use of my novel ball cage in a radial bearing;

Fig. 7 an edge view of my novel ball cage, partly broken away, illustrating the mode of inserting a ball in a pocket, and Fig. 8 is a similar view showing the ball in the pocket.

10 denotes the cage which is in shape a flat ring and is provided with pockets 11 to receive the balls 12. The essential feature of novelty is that holes 13 of less diameter than the pockets lead into the pockets from each side of the cage, so that a retaining flange for the ball is formed at each end of the pocket. The cage is formed of fiber or of any similar composition possessing the necessary rigidity and wearing quality and also sufficient flexibility to permit the balls to be sprung into the pockets from either side past the retaining flanges, which yield and permit the balls to pass into the pockets and instantly spring back to place and retain the balls securely. In Figs. 1 and 2, I have shown the invention as applied to a plain thrust bearing, in which my novel ball cage is used between two steel collars indicated by 14, which have flat surfaces over which the balls may travel.

In Figs. 3 and 4, I have shown the invention as applied to the grooved type of thrust bearing in which my novel ball cage is used between two steel collars indicated by 15, which are provided with grooves 16 which partly receive the balls. In Figs. 5 and 6, I have shown the invention as applied to the radial type of bearing in which the collars, indicated by 17 and 18, lie one within the other and are provided with oblique faces shown in the present instance as provided with grooves which partly receive the balls.

The mode of inserting the balls in place is clearly illustrated in Fig. 7. The balls are simply sprung into the pockets past the retaining flanges, which yield sufficiently to permit the balls to pass and then retain the balls in place.

My novel ball cage has many advantages over all others now in use. They are much cheaper to make than are metallic ball cages. The material costs less, less work is required upon them, and when finished they are ready to use, that is, no additional tooling or other operation is required to secure the balls in place. Another and quite important advantage is that bearings provided with my novel ball cages are much quieter in use.

Having thus described my invention, I claim:—

A ball cage for bearings provided with pockets, each pocket having a hole leading into it from each side of the cage, of less diameter than the pocket, leaving a retaining flange at each end of the pocket, which yields when a ball is sprung in and then retains the ball.

In testimony whereof I affix my signature.

LEWIS R. HEIM.